United States Patent
Cox et al.

(10) Patent No.: US 7,975,960 B2
(45) Date of Patent: Jul. 12, 2011

(54) NOSEWHEEL CONTROL APPARATUS

(75) Inventors: Isaiah Watas Cox, Baltimore, MD (US); Joseph Jeremiah Cox, Vancouver, WA (US)

(73) Assignee: Borealis Technical Limited (GI)

( * ) Notice: Subject to any disclaimer, the term of this patent is extended or adjusted under 35 U.S.C. 154(b) by 579 days.

(21) Appl. No.: 11/991,344

(22) PCT Filed: Aug. 29, 2006

(86) PCT No.: PCT/US2006/033503
§ 371 (c)(1), (2), (4) Date: Feb. 29, 2008

(87) PCT Pub. No.: WO2007/027588
PCT Pub. Date: Mar. 8, 2007

(65) Prior Publication Data
US 2009/0261197 A1 Oct. 22, 2009

Related U.S. Application Data

(60) Provisional application No. 60/731,152, filed on Oct. 28, 2005, provisional application No. 60/712,739, filed on Aug. 29, 2005.

(51) Int. Cl.
*B64C 25/50* (2006.01)

(52) U.S. Cl. ............... 244/50; 244/103 R; 244/229

(58) Field of Classification Search ............... 244/50, 244/229, 103 R; 701/120
See application file for complete search history.

(56) References Cited

U.S. PATENT DOCUMENTS

| | | | | |
|---|---|---|---|---|
| 4,881,701 A | * | 11/1989 | Bullard | 244/49 |
| 5,141,173 A | * | 8/1992 | Lay | 244/2 |
| 7,445,178 B2 | * | 11/2008 | McCoskey et al. | 244/50 |

* cited by examiner

*Primary Examiner* — Tien Dinh
*Assistant Examiner* — Michael Kreiner

(57) ABSTRACT

An apparatus for driving a taxiing aircraft is disclosed, comprising, in an aircraft, two self-propelled nosewheels, each having an electric motor; equipment for flight; dual-function controlling means for controlling said equipment for flight and said nosewheels, said dual-function controlling means being disposed in the cockpit of said aircraft; sensing means; and switching means, —wherein said switching means are operable to switch the function of said dual-function controlling means between controlling said equipment for flight and controlling said nosewheels. Said dual function controlling means may control speed and/or steering of the aircraft. Second controlling means may be provided, and may be disposed externally to the aircraft.

26 Claims, 4 Drawing Sheets

NOSEWHEEL CONTROL APPARATUS

CROSS-REFERENCE TO RELATED APPLICATIONS

This application is the U.S. national stage application of International Application No. PCT/US2006/033503, filed Aug. 29, 2006, which international application was published on Mar. 8, 2007, as International Publication WO2007/027588 in the English language. The International Application claims the benefit of U.S. Provisional Patent Application No. 60/712,739, filed Aug. 29, 2005 and U.S. Provisional Patent Application No. 60/731,152, filed Oct. 28, 2005. The above-mentioned patent applications are assigned to the assignee of the present application and are herein incorporated in their entirety by reference.

TECHNICAL FIELD

The present invention relates to self-propelled nosewheel motors and in particular to the control thereof.

BACKGROUND ART

The invention relates to control of aircraft equipment, specifically to control of a self-propelled nosewheel. The present invention relates to the field of aircraft interfaces, and in particular to interfaces controlling motorized aircraft wheels.

The use of small compact electric motors inside, or in close proximity to, an aircraft wheel, for direct drive, presents a problem relating to the provision of the required amounts of torque. Generally, for moving an aircraft from rest, the torque required is extremely high, so that the torque versus speed characteristics of the load, and the maximum speed characteristics of the load when driven, fall well outside the ideal predicted by motor scaling laws. This means that a motor sized to produce the torque necessary for direct drive of the load will be operating at well below maximum speed, and thus well below maximum power levels. The active materials of the machine will be underutilized, the machine will be far heavier than necessary, and the machine efficiency will be poor.

Gearing can provide a higher speed, lower torque motor with a higher torque option to enable a motor to be housed within a wheel. The wheel itself is expected to operate during takeoff and landing at much higher than normal motoring speeds. This presents a significant problem, because, in these cases, the wheels may be rotating faster than the motor and may accelerate the motor via the gearing system. Under these conditions, the motor would be forced to spin at much higher speeds than rated.

U.S. Pat. No. 3,711,043 to Cameron-Johnson discloses an aircraft drive wheel having a fluid-pressure-operated motor housed within the wheel and two planetary gear stages housed in a gear box outboard of the motor, the final drive being transmitted from a ring gear of the second gear stage, which is inboard of the first stage, to the wheel through an output drive quill coupled, through a disc-type clutch if desired, to a flanged final drive member bolted to the wheel.

U.S. Pat. No. 3,977,631 to Jenny discloses a wheel drive motor selectively coupled to an aircraft wheel through a rotatably mounted aircraft brake assembly in order to drive the wheels of an aircraft. The normally non-rotating stator portion of a conventional aircraft brake assembly is rotatably mounted about the wheel axle and is rotatably driven through a planetary gear system by the wheel drive motor.

A solution disclosed in PCT application WO2005/035358 discloses a mesh connected high phase order induction motor, situated in close proximity to, and preferably within, the nosegear. The mesh connection enables variable inductance so that the machine has a range of speed/torque profiles available.

Various guidance systems for aircraft taxi are disclosed in the art. The degree of automation in taxiing may vary.

U.S. Pat. No. 6,411,890 to Zimmerman discloses a method for the guidance of aircraft on the taxiways of the airport apron with position lights located on the taxiways and, possibly, other locations on the apron. It comprises the following components: a navigation system to determine the current aircraft position; a sensor on the aircraft to detect position and measure lights, reference information including light positions, a comparison of the path pursued by the navigation system with the reference information, and using the detected lights as waypoints for the navigation system. The method determines the current aircraft position more precisely than purely through the navigation system, and generates guidance information based on the determined aircraft position. The invention further discloses an additional sensor for the detection of lights and their position measurement. The latter should be performed with a precision of approx. 10 cm. Video cameras and scanners, for example which can be advantageously arranged on the aircraft main landing gear, are suited for this task.

U.S. Pat. No. 6,690,295 to De Boer teaches a device for determining the position of an aircraft at an airport, including sensors for detecting radio signals originating from a vehicle. The sensors are positioned at regular intervals from one another on parts of the airport which are accessible to the vehicle. The sensors are fitted in light positions of runway lighting provided at the airport on taxiways, take-off and landing runways and on platforms. The signal originating from a radio altimeter of an aircraft is used as the radio signal. Data communication takes place from the sensors via power supply lines of the light points. A central processing device is provided with warning means to generate a warning if the detected position of the vehicle is outside a predefined area at the airport which is permitted to the vehicle.

A sophisticated control system is utilized in a Space Shuttle Orbiter vehicle. The vehicle uses a conventional type of landing system having an aircraft tricycle configuration consisting of a nose landing gear and a left and right main landing gear. The nose landing gear is located in the lower forward fuselage, and the main landing gear is located in the lower left and right wing area adjacent to the mid-fuselage. The nose wheel is equipped with a ground proximity sensor, in order to determine Weight on Nosegear (WONG), a parameter required during landing. After landing, when WONG and other safety parameters have been established, Nose Wheel Steering (NWS) is enabled. One or more steering position transducers on the nose wheel strut transmit nose wheel steering position feedback to a comparison network so that the nose wheel commanded and actual positions may be compared for position error.

Braking is accomplished by a sophisticated system that uses electrohydraulic disk brakes with an anti-skid system. Only the two main gear sets have braking capability, and each can be operated separately. Two primary steering options are available. By applying variable pressure to the brakes, the crew can steer the vehicle by a method called differential braking. Also, by selecting nose wheel steering, the crew can use the rudder pedal assembly to operate an hydraulic steering actuator incorporated in the nose landing gear. The crew can also use the rudder to assist steering while at higher ground speeds.

Each main landing gear wheel has two speed sensors that supply wheel rotational velocity information to the skid control circuits in the brake/skid control boxes. The velocity of each wheel is continuously compared to the average wheel velocity of all four wheels. Whenever the wheel velocity of one wheel is a predetermined percentage below the average velocity of the four wheels, skid control removes brake pressure from the slow wheel until the velocity of that wheel increases to an acceptable range.

Motor-Generator machines able to provide high torque at low speed, which are small and compact, are disclosed in the art.

1. WO05112584 to Edelson discloses a motor-generator machine comprising a slotless AC induction motor. The motor disclosed therein is an AC induction machine comprising an external electrical member attached to a supporting frame and an internal electrical member attached to a supporting core; one or both supports are slotless, and the electrical member attached thereto comprises a number of surface mounted conductor bars separated from one another by suitable insulation. An airgap features between the magnetic portions of core and frame. Electrical members perform the usual functions of rotor and stator but are not limited in position by the present invention to either role. The stator comprises at least three different electrical phases supplied with electrical power by an inverter. The rotor has a standard winding configuration, and the rotor support permits axial rotation.

2. WO2006002207 to Edelson discloses a motor-generator machine comprising a high phase order AC machine with short pitch winding. In the following, H is the harmonic order of a waveform, N is the number of turns in a winding, and Δ is the span value of a mesh connected stator winding. Disclosed therein is a high phase order alternating current rotating machine having an inverter drive that provides more than three phases of drive waveform of harmonic order H, and characterized in that the windings of the machine have a pitch of less than 180 rotational degrees. Preferably the windings are connected together in a mesh, star or delta connection.

The term 'winding' therein refers to the group of all of the windings and/or coils and/or conductors of a single phase, unless otherwise specified. The winding that constitutes each phase consists of a 'supply half' and a 'back half'. The 'supply half' is driven by the power supply, and has a phase angle dependent on the power supply phase or phases to which it is connected. The phase angle of the back half of each phase is equal to the phase angle of the supply half, offset by 180 ED. The pitch of a winding is the number of rotational degrees between the supply half of the winding and the back half of the winding.

Recommended therein is a way of making the winding shorter and at the same time making the magnetomotive force more sinusoidal, by using short pitch windings, and by distributing the winding over several slots. When the coils of the winding are distributed over several slots, there is a reduction in the combined induced electromotive force. The individual coils of each winding will have a different spatial orientation due to the slots and there will be a phase difference between them.

Concentrated windings may also be used, wherein the coils of each half of a winding are contained in one slot only.

A method for operating a high phase order induction motor is also disclosed therein, involving electrically connecting N windings into a mesh connection with a value of Δ that provides a substantial range in speed/torque relation when operating with at least two out of first, second and third harmonic, low order harmonics being the most efficient.

The above disclosure is further directed to selection of a winding pitch that yields a different chording factor for different harmonics. The aim is to select a chording factor that is optimal for the desired harmonics.

3. Disclosed in WO2006/065988 to Edelson is a motor-generator machine comprising stator coils toroidally wound around the inside and outside of a stator. The machine may be used with a dual rotor combination, so that both the inside and outside of the stator may be active. Even order drive harmonics may be used, if the pitch factor for the windings permits them.

Said coils may be connected in series or may be independent.

In one embodiment of this motor-generator machine, an AC electrical rotating apparatus is composed of: a rotor, a substantially cylindrically shaped stator that has one surface that faces the rotor, and a number of conductive coils. Each coil is disposed in a loop wound toroidally around the stator. A drive means, for example an inverter, provides more than three different drive phases to the coils. In a further embodiment, the machine is equipped with teeth or slots for lending firm support to said coils. The slots may be on the stator surface that faces the rotor or also on the opposite stator surface. In a preferred embodiment, each of the coils is driven by a unique, dedicated drive phase. However, if a number of coils have the same phase angle as one another, and are positioned on the stator in different poles, these may alternatively be connected together to be driven by the same drive phase. In a further alternative, where two coils or more have a 180 electrical degree phase angle difference between them, they may be connected in anti-parallel to the same drive phase.

The AC machine coils may be connected and driven in a number of ways, including but not restricted to: a star connection and a mesh connection. It is preferable that the drive means, for example, the inverter, be capable of operating with variable harmonic drive, so that it may produce the impedance effect. In one embodiment, the coils are connected with short pitch windings. In a preferred embodiment, the coils are connected to be able to operate with 2 poles, or four poles, under H=1 where H is the harmonic order of the drive waveform. The coils may be connected together in series, parallel, or anti-parallel.

4. In U.S. Patent Appl. Pub. No. 2006/0273686, a motor-generator machine is disclosed comprising a polyphase electric motor which is preferably connected to drive systems via mesh connections to provide variable V/Hz ratios. The motor-generator machine disclosed therein comprises an axle; a hub rotatably mounted on said axle; an electrical induction motor comprising a rotor and a stator; and an inverter electrically connected to said stator; wherein one of said rotor or stator is attached to said hub and the other of said rotor or stator is attached to said axle.

Such a machine may be located inside a vehicle drive wheel, and allows a drive motor to provide the necessary torque with reasonable system mass. In one embodiment the stator coils are wound around the inside and outside of the stator. In a further embodiment, the machine contains a high number of phases, greater than three. In a further embodiment, the phases are connected in a mesh connection. In a further embodiment, each half-phase is independently driven to enable second harmonic drive for an impedance effect. Improvements are apparent in efficiency and packing density.

5. WO06113121 discloses a motor-generator machine comprising an induction and switched reluctance motor designed to operate as a reluctance machine at low speeds and an inductance machine at high speeds. The motor drive provides more than three different phases and is capable of synthesizing different harmonics. As an example, the motor may be wound with seven different phases, and the drive may be capable of supplying fundamental, third and fifth harmonic. The stator windings are preferably connected with a mesh connection. The system is particularly suitable for a high phase order induction machine drive systems of the type disclosed in U.S. Pat. Nos. 6,657,334 and 6,831,430.

The stator of the induction/reluctance motor may be wound with any even number of poles. The rotor, in combination with the stator, is designed with a particular structure that reacts to a magnetic field configuration generated by one drive waveform harmonic. The reaction to this harmonic by the rotor structure produces a reluctance torque that rotates the rotor. For a different harmonic drive waveform, a different magnetic field configuration is produced, for which the rotor structure defines that substantially negligible reluctance torque is produced. However, this magnetic field configuration induces substantial rotor currents in the rotor windings, and the currents produce induction based torque to rotate the rotor.

In a further embodiment of the induction/reluctance motor, the rotor and stator each have a different high number of very small teeth. Magnetic poles are established to rotate the rotor. 'Interference', or 'correlation' between the stator and rotor teeth will tend to follow the magnetic poles, causing the rotor to move much more slowly than the magnetic poles.

In a further embodiment of the of the induction/reluctance motor, the rotor is structured to produce a substantial reluctance torque under operation of a first harmonic, and a negligible reluctance torque under operation of another harmonic. The harmonic that provides substantial reluctance torque is used to cause the motor to operate based on the reluctance principle, and a harmonic that provides negligible reluctance torque is used to drive the motor as an induction motor.

In a further embodiment of the induction/reluctance motor, the difference between the number of stator teeth and the number of rotor teeth is equal to half of the pole count of the developed magnetic field used to drive the rotor due to reluctance.

In a further embodiment of the induction/reluctance motor, the rotor is designed with a number of salient poles or flux guides that produces substantial reluctance torque under the operation of a magnetic field of a certain pole count, but produces negligible reluctance torque, and substantial inductance-based torque, under the operation of a second magnetic field with a second pole count. The two magnetic fields are set up in a stator, having more than three different phases per pole. Two different harmonics, that develop a different number of poles to one another, are used.

For a transition between the induction and reluctance effects, it is possible to separately generate two different harmonics. The rotor may be structured so that when driven by the harmonic producing the reluctance effect, the rotor rotates in the reverse direction to the rotating stator magnetic field. In order to enable the rotation of such a rotor to be in the same direction for both effects, the harmonic that produces one of the effects can be synthesized to cause magnetic field rotation in the opposite direction to the other harmonic. For example, the harmonic used to produce the reluctance effect is supplied to the stator windings in reverse phase order. Alternatively, the harmonic used to produce one of the effects could be a harmonic that produces a magnetic field that rotates in the reverse direction, such as the fifth harmonic in a 3-phase machine. However, a rotor could also be structured that rotates in the same direction as the rotating magnetic field. This is preferred, for one reason because any harmonic will generate for the rotor some level of inductance based torque, and it is preferable that this will be in the same direction to rotation.

In a further embodiment of the induction/reluctance motor, the stator windings are connected mesh. The span of the mesh is chosen according to the envisioned usage of the machine, since the span has an effect on the inductance of the machine when different harmonics are synthesized.

In further embodiments of the induction/reluctance motor, the stator windings may be wrapped in a toroidal fashion around the stator, the number of driven phases may be half the number of slots, each driven phase may be distributed amongst two adjacent slots, the number of driven phases may be equal to the number of slots, and/or each driven phase may be distributed amongst two adjacent slots.

In a further embodiment, a polyphase motor includes a drive unit to synthesize N phases of alternating current, where N is more than three per 180 degrees; and to select between applying a Type A and a Type B harmonic drive waveform for the N phases. The Type A and Type B harmonic drive waveforms each include at least one harmonic order that the other does not comprise. The polyphase motor also includes a stator and a rotor, in which the stator has N stator winding phases, driven by the drive unit; and the stator and rotor have profiles suited to produce substantial reluctance based rotor rotation when the Type A harmonic drive waveform is applied. The rotor has windings, suited for producing substantial inductance based rotor rotation when the Type B harmonic drive waveform is applied.

In a further embodiment, the invention describes a method for operating a motor capable of both inductance based and reluctance based operation. The method includes: providing a stator and rotor structure suitable for use as an induction motor, having both windings and a reluctance profile; supplying more than three different phases of alternating current to said stator, to rotate said rotor; and providing a selection of the following operational modes:

(i) supplying the alternating current to provide a stator magnetic field that produces a stator magnetic field matching the reluctance profile, and operable to rotate the rotor due to the reluctance effect, (ii) supplying the alternating current to provide a stator magnetic field that is substantially inoperable to rotate the rotor due to the reluctance effect yet is operable to rotate the rotor due to the induction effect.

DISCLOSURE OF INVENTION

It can be seen from the foregoing that it would be advantageous to be able to drive an aircraft on the ground using cockpit controls. It would be further advantageous to be able to drive an aircraft on the ground using controls on the ground within an airport, and to be able to transfer control between controllers.

The present invention is a nosewheel control apparatus between an operator and an aircraft, whereby a motorized aircraft wheel or wheels may be controlled during taxi.

BRIEF DESCRIPTION OF DRAWINGS

For a more complete explanation of the present invention and the technical advantages thereof, reference is now made to the following description and the accompanying drawings, in which.

BEST MODE FOR CARRYING OUT THE INVENTION

Embodiments of the present invention and their technical advantages may be better understood by referring to the figures and the following explanation.

Figure 1:
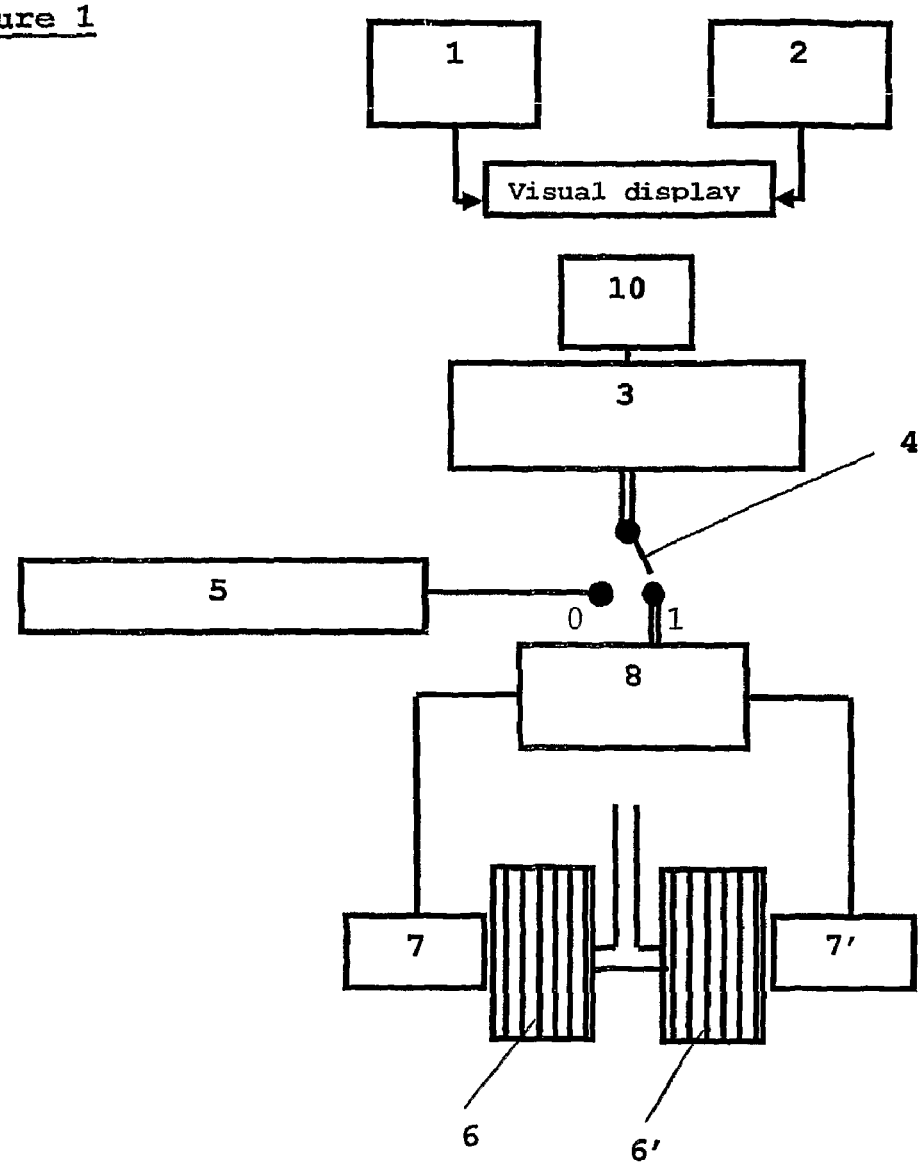
FIG. 1 is a block diagram of the first embodiment of the invention.

A first embodiment of the present invention comprises, in an aircraft, two self-propelled nosewheels, each having an electric motor; equipment for flight; dual-function controlling means for controlling said equipment for flight and said nosewheels, said dual-function controlling means being disposed in the cockpit of said aircraft; a motor controller; sensing means; a visual display disposed in said cockpit; a toggle switch; and switching means. This may be better understood by reference to FIG. 1, which shows two nosewheels 6, 6' each propelled by an electrical motor 7, 7'. Each motor is connected to the motor controller 8. Switching means 4 are switchably connected to the motor controller and to equipment for flight 5, and permanently connected to cockpit controlling means 3.

The dual function controlling means are switchably connected both to said equipment for flight and to the motor controller. The dual-function controlling means controls the equipment for flight when in flight and the nosewheel during taxi. Sensing means 1 is connected to visual display 9 and senses when the aircraft is on the ground. Further sensing means 2 may be connected to visual display 9 and may sense when the aircraft is on the ground. When the pilot sees from visual display 9 that the aircraft is on the ground, s/he operates toggle switch 10. Toggle switch 10 is connected to switching means 4, which are in turn connected to the equipment for flight when switching means 4 are off, and to the nosewheels when switching means 4 are on. In this way, when the sensor or sensors indicate that the aircraft is on the ground, the pilot operates toggle switch 10 and the dual-function equipment is switched from flight mode to taxi mode, that is, nosewheel control. An advantage of this embodiment is that, since no data is fed from the nosewheel motor to the cockpit controls, the invention can be added to an existing aircraft with no risk or interference with existing cockpit controls.

Figure 2:
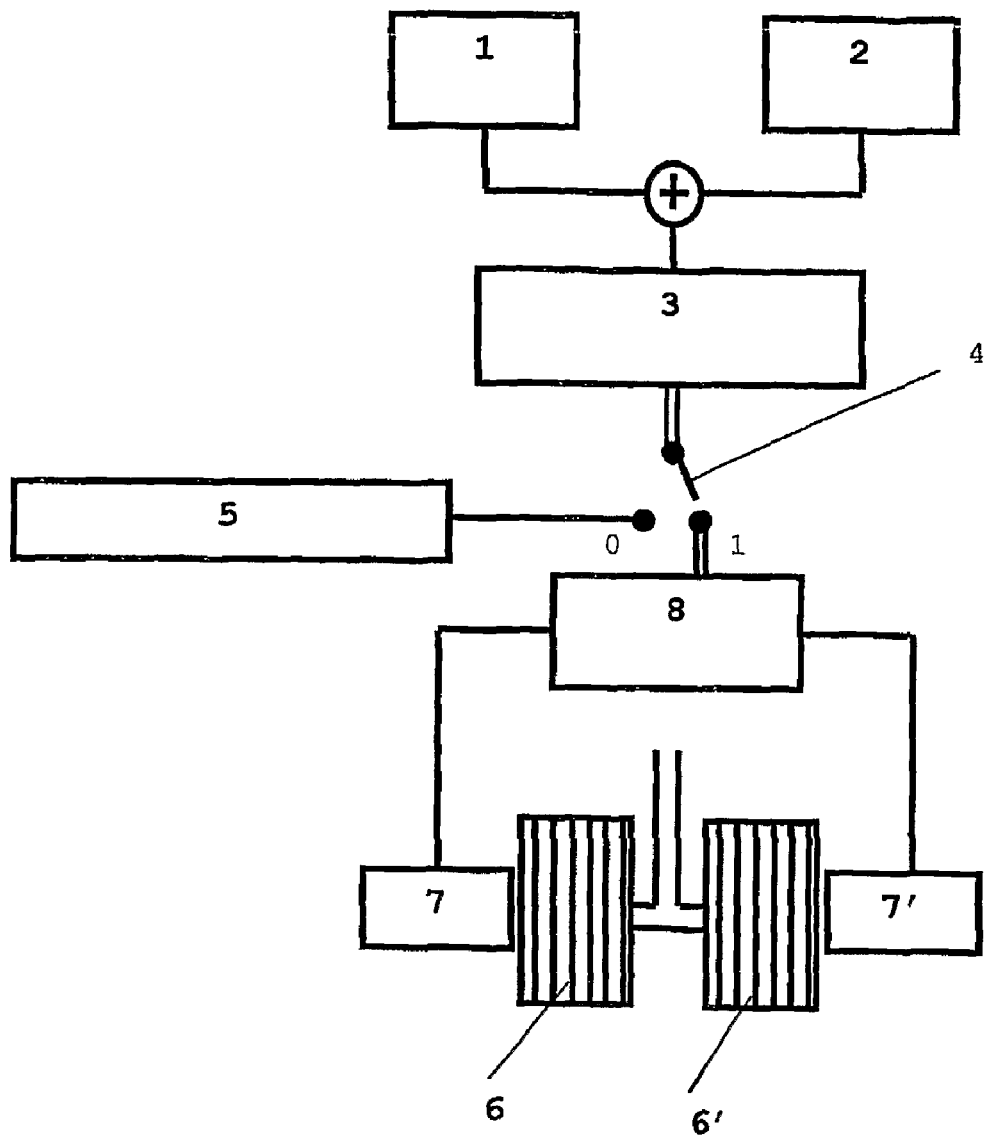
FIG. 2 is a block diagram of the second embodiment of the invention.

In a second embodiment of the present invention, sensing means 1 is able to sense when the aircraft is on the ground. This may be better understood by reference to FIG. 2, which shows two nosewheels 6, 6' each propelled by an electrical motor 7, 7'. Each motor is connected to the motor controller 8. Switching means 4 are switchably connected to the motor controller and to equipment for flight 5, and permanently connected to cockpit controlling means 3. According to this embodiment, the dual-function controlling means controls the equipment for flight when in flight and the nosewheel during taxi. Sensing means 1 is connected to switching means 4 via dual-function controlling means 3 and senses when the aircraft is on the ground. Further sensing means 2 may be connected to switching means 4 via dual-function controlling means 3 and may sense when aircraft is on the ground. Switching means 4 are connected to the equipment for flight when switching means 4 are off and to the nosewheels when switching means 4 are on. In this way, when the sensor or sensors indicate that the aircraft is on the ground, switching means 4 is turned on automatically and the dual-function equipment is switched from flight mode to taxi mode, that is, nosewheel control. A toggle switch (not shown) may also be provided for manually switching between taxi mode and flight mode, and it may override the automatic switch. The sensing means may additionally provide a visual indicator to the pilot, to inform the pilot that the aircraft is on the ground. Said visual indicator may be a light, screen display, or any other visual indicator. The sensing means are connected to the dual-function control via the switching means and switch the function automatically to taxi mode upon detecting that the aircraft is on the ground.

For either of these embodiments a safety function may be provided whereby the toggle switch may only be activatable when the aircraft is traveling below a particular speed. For example, but without limitation, this speed could be below that at which one would use ailerons, eg 35 mph. The safety function may rely on the sensing means or may be independent. Manual mode switching may be achieved by other means, for example, a thumb switch. Said thumb switch may be part of a joystick, yoke or side-stick. Manual mode switching may also be achieved by a particular operation within existing cockpit equipment, for example, by twisting a sidestick or some other particular operation.

A safety de-activation function may be provided whereby the function of the dual-function controlling means is automatically reverted to flight mode when the sensing means senses that the aircraft is in the air.

When in taxi mode, the dual-function controlling means operate the nosewheel. Means are preferably provided for steering left and right, and for accelerating and decelerating. Alternatively, means are provided only for steering, or only for speed control.

Said motors in said self-propelled nosewheels are preferably a mesh connected, high phase order, electric induction motor but may also be any other induction motor or other drive means. Specifically, said motors may be any of those described in the Background section of this patent.

Said equipment for flight may be rudders, flaps, ailerons, turbines, tillers, or any equipment which is controlled by controlling means in the cockpit of said aircraft, and which is not used during aircraft taxi. Preferably, said equipment for flight is used to effect steering and/or speed control in flight. This will provide familiarity for the pilot when using said dual-function controlling means to effect steering and/or speed control of said nosewheels.

Said dual-function controlling means may be any controlling means disposed in the cockpit of said aircraft, for controlling any equipment for flight, which has steering or other two-sided functionality, so that the left and right nosewheels can be controlled independently. For example but without limitation, this may be a steering wheel, joystick, side-stick, mouse, scroll ball, keyboard, yoke, or pedals. The unit may be modified for this purpose.

As a specific example, without limitation, the stick used in flight to control throttle and steer the aircraft may be used. The device used to input throttle during flight may be used to input speed during taxi, and the device used to input steering commands in flight may be used to input steering commands during taxi. In this way, the pilot uses familiar control methods to drive the aircraft.

As a second specific example, without limitation, the device used in flight to control the yaw, pitch, and roll of the aircraft may be used to control the aircraft during taxi, with the yaw control controlling the steering of the aircraft and the pitch control controlling the speed. This would similarly be using control methods familiar to the pilot.

More than one cockpit device may be used in conjunction to control more than one of the speed, steering and torque of the nosewheel. Furthermore, equipment may be provided in the cockpit to control the steering, speed and/or torque of the nosewheels exclusively.

Said motor controller is preferably software which communicates with said motors and with said sensing means.

Said sensing means is preferably a tire pressure gauge, which senses when the tire is on the ground by detecting a higher pressure. The sensing means could also be means for applying a slight magnetic field. Said sensing means may also be means for applying a slight magnetic field to the motor. If the motor is spinning, that is, if the aircraft is on the ground and moving, the application of a slight magnetic field will cause electricity to be generated in the motor and fed back to the inverter. The amount of electricity produced can also be used to determine the speed of the aircraft. If the motor is stopped, applying a slight magnetic field to it will not produce electrical returns. The sensing means may also be means for applying a small amount of forward torque followed by a small amount of reverse torque. If this causes the motor to rotate, it can be deduced that the aircraft is in the air. If this does not cause the motor to rotate, it can be deduced that the aircraft is on the ground. The sensing means may also be means for determining when ground speed and airspeed stay below a particular speed, for example but without limitation, 25 mph, for a given amount of time, for example but without limitation 3 seconds.

Said sensing means may also comprise any of a speed sensor, a weight sensor, a height sensor, a temperature sensor, input from ground speed measuring instruments, or any other workable means to reliably deduce that the aircraft is taxiing. The sensing means may be mechanical or may be software.

One or more of the above sensing means may be provided or may be required to permit the visual display to display the information that the aircraft is on the ground. Preferably, said visual indicator is a light, but it may also be a screen display, or any other visual indicator.

Electrical braking is used to control the speed of the motors. This may involve changing the magnetic field applied to the motors, for example by changing the voltage, current, frequency or other parameter of the current supplied by the inverter to the motor. Differential electrical braking is used to effect steering, thus applying the left-turn maneuver of the dual-function controlling means will cause the motor controller to send signals to the motor of the left nosewheel to brake but not the right, effecting a left turn. The right turn maneuver will cause the motor controller to send signals to the motor of the right nosewheel to brake but not the left, effecting a right turn. Preferably, the motor controller can detect the pressure applied to the dual-function controlling means and send signals to change the speeds of the motors proportionately to the pressure applied to the dual-function controlling means, thus a light pressure will effect a wide turn and a heavy pressure will effect a sharp turn. Alternatively, the motor controller may not be sensitive to pressure. A separate control, for example the thrust, may be used to accelerate both motors together to increase the speed of the aircraft. Both the left and right sides of the dual-function controlling means may be used concurrently to decrease the speed of the aircraft. Alternatively, forwards and backwards movement may be used to accelerate and decelerate respectively. Furthermore, additional cockpit controls may be configured to enable mechanical braking. Alternatively, electrical braking may be achieved using the regular aircraft brake controls. Braking may also be achieved using separate cockpit nosewheel brake controls, which may be connected to a disc brake, drum brake, electromagnetic brake, electromechanical brake, anti-lock brake, or any type of brake or wheel retarding means. Furthermore, the motors can be decelerated by applying a stationary magnetic field or by driving them in a direction opposite to the direction of travel.

The nosewheel motors may alternatively be connected such that applying the dual-function controlling means alters the torque of the nosewheel motors, thus the aircraft is steered by using the rudder dual-function controlling means to apply differential torque to the nosewheel motors. The motors may also be connected such that applying the dual-function controlling means effects a change in motor speed and/or direction using any motor speed control techniques known in the art, including but not limited to varying voltage, vector field control, slip, current, resistance, and frequency. Furthermore, the motors may be connected such that applying the dual-function controlling means effects a turn and/or a change in speed by any other workable means.

Power switching means may be provided in the form of a push-button, switch, keyboard command or any other switching means. Said power switching means switchably connect the nosewheel motors to an auxiliary power unit (APU) on the aircraft, and to the main aircraft turbines. The APU is that used to power air conditioning, lighting, and other auxiliary aircraft functions. The turbines are used for propelling the aircraft. The motor may be able to be powered by either power source. However, the motor may be permanently connected to one power source. Advantages of the ability to switch power sources include redundancy in power provision, and the ability to power a nosewheel when no APU is present, as is sometimes the case.

Some advantages of the nosewheel control apparatus disclosed herein are detailed below.

The nosewheel control apparatus is designed to be installed using existing, standard equipment in an aircraft cockpit, although it is not limited to this and may include new equipment. An advantage of this invention, therefore, is that additional control features are added to the cockpit without the need to fit new equipment.

Using existing cockpit equipment further enables the aircraft to be driven using controls and methods that are familiar to the pilot from flight.

The use of a visual display and the reliance on the pilot to manually switch the dual-function controlling means to taxi mode, as disclosed in the first embodiment above, provides a safer system. Further, this configuration means that while the nosewheel motors receive information from the cockpit, the cockpit instruments are not reliant on any information received from the nosewheel motors. This means that installation of this invention is low-risk and will not interfere with cockpit systems and safety features already in place. This further enables ease of installation.

Alternatively, an advantage of the second embodiment disclosed above is that, since the aircraft switches into taxi mode automatically upon detecting that the aircraft is on the ground, there is one less task for the pilot to do.

Non-powered nosewheels are usually steered using differential braking, with mechanical brakes such as hydraulic or disc brakes. These cause heat loss due to friction as well as wear to the wheel. A further advantage of this invention is that differential mechanical braking is avoided and electrical braking used instead. Since the nose wheel is electrically powered, electricity can be used to control the speed.

Figure 3:
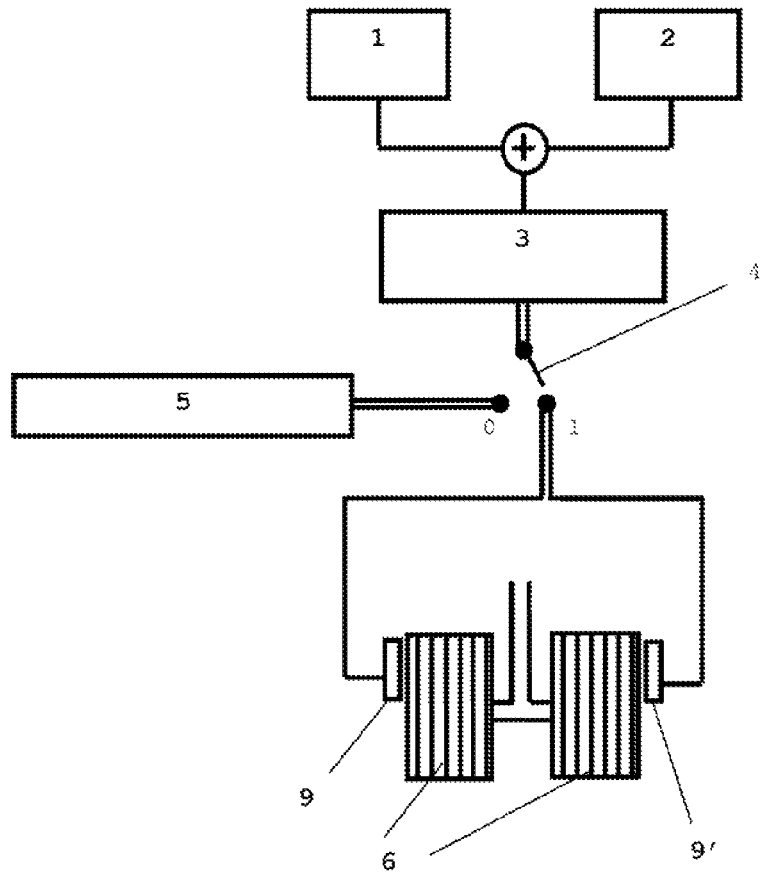
FIG. 3 is a block diagram of the third embodiment of the invention.

A third embodiment of present invention preferably comprises two self-propelled nosewheels; equipment for flight; dual-function controlling means for controlling said nosewheels and said equipment for flight, having at least a first side operation and a second side operation; sensing means; and switching means. The dual-function controlling means are switchably connected to both the equipment for flight and the nosewheels. As shown in FIG. 3, sensing means 1 and sensing means 2 are connected to switching means 4 via dual-function controlling means 3. When the sensing means indicate that the aircraft is on the ground, switching means 4 connects rudder pedals 3 to nosewheels 6. When the sensing means indicate that the aircraft is in flight, switching means 4 connect dual-function controlling means 3 to equipment for flight 5. The dual-function controlling means 3 control the equipment for flight during flight and the nosewheel during taxi. At least one sensing means 1, 2 senses when the aircraft is on the ground. When the sensor or sensors indicate that the aircraft is on the ground, switching means 4 are turned on, and the dual-function controlling means are switched from flight mode to taxi mode, that is, nosewheel control. In an alternative arrangement, the sensing means provide a visual display in the cockpit when the aircraft is sensed to be in the ground, and the pilot manually operates a toggle switch connected to switching means 4, to switch the dual-function controlling means to taxi mode, that is, nosewheel control.

According to this embodiment one or more of the above sensing means may be provided or may be required to switch the functions of the dual-function equipment from flight mode to taxi mode.

The sensing means may provide a visual indicator to the pilot, to inform the pilot that the aircraft is on the ground. Said visual indicator may be a light, screen display, or any other visual indicator.

The sensing means may be connected to the dual-function control via the switching means and switch the function automatically to taxi mode upon detecting that the aircraft is on the ground.

A toggle switch may be provided for manually switching between taxi mode and flight mode. This may override the automatic switch or may be the only means of switching modes.

The dual-function controlling means steer the nosewheels by differential braking.

Preferably, differential mechanical braking is used to steer the aircraft on the ground. Thus, when a first side operation of said dual-function controlling means is applied, the brake 9 is applied to the left nosewheel.

Thus the aircraft turns to the left. When a second side operation of said dual-function controlling means is applied, the brake 9 is applied to the right nosewheel. Thus the aircraft turns to the right. The brakes are preferably disc brakes, but may be drum brakes, hydraulic brakes, anti-lock brakes, or any other brakes or wheel retarding means.

Preferably, the dual-function controlling means are pressure-sensitive, and the mechanical brakes provide a response proportional to the pressure applied to the dual-function controlling means. Thus a light pressure will effect a wide turn and a heavy pressure will effect a sharp turn.

A separate control, for example the thrust, may be used to accelerate both motors together to increase the speed of the aircraft. Both the first and second side operations of the dual-function controlling means may be used concurrently to decrease the speed of the aircraft. Alternatively, forwards and backwards movement, or third and fourth side operations of the dual-function controlling means, may be used to accelerate and decelerate respectively. Braking may also be achieved using separate cockpit nosewheel brake controls, which may be connected to a disc brake, drum brake, electromagnetic brake, electromechanical brake, anti-lock brake, or any type of brake or wheel retarding means.

An advantage of this embodiment of the nosewheel control apparatus is that, since the braking means are mechanical and the steering means are through differential mechanical braking, it is not necessary for the nosewheels to be propelled by electric motors.

A fourth embodiment of the nosewheel control apparatus comprises any of the previous embodiments, wherein the dual-function controlling means are connected to the equipment for flight mechanically, and connected to the motor controller or motors via a wireless link.

Preferably, the wireless link is a secure link protected for example and without limitation by a password or by encryption. The wireless link may be, for example and without limitation, fiber optic cable or radio communication. These could be routed either directly to the motor controller itself or to the electronics bus of the aircraft, or through cockpit interfaces.

The apparatus is connected as in any of the figures. The link between switching means 4 and motor controller 8 or motors 7, 7' is wireless.

The apparatus and variations thereof are as described in any of the previous embodiments, and preferably as described in the first embodiment.

A fifth embodiment of the invention comprises two self-propelled nosewheels; at least two sets of nosewheel controlling apparatus as described in any of the forgoing embodiments, a first set in the cockpit and at least one second set outside the aircraft; and transfer means for transferring control from one set of equipment to another.

Preferably, the nosewheel controlling apparatus situated outside the aircraft is operated by airport ground personnel, air traffic controllers or other airport staff other than the pilot. Alternatively, the nosewheel controlling apparatus situated outside the aircraft is operated automatically by computer systems.

The first set of apparatus may be any of the forgoing embodiments. The second set of apparatus may be a steering wheel, pedals, joystick, side-stick, yoke, computer keyboard, scroll ball, mouse, or any other workable equipment or combination of equipment having two-sided functionality to enable steering. The apparatus preferably additionally comprises accelerating and/or braking capability, but may not do so.

The second set of apparatus may further comprise a toggle switch, thumb switch, button or other switching means for manually switching control of the nosewheel between the remote controller and the pilot. A safety function may be provided whereby the transfer switch may only be activatable when the aircraft is travelling below a particular speed. For example, but without limitation, this speed could be below that at which one would use ailerons, eg 35 mph. Furthermore, this speed could be zero. Alternatively, the equipment may further comprise sensors and a safety function may be provided whereby the switch may only be activatable when the aircraft is sensed by sensors to be on the ground, within the airport, at rest, or any other useful safety measure.

The second set of apparatus may be connected to the motor controller via a wireless link.

Preferably, the wireless link is a secure link protected for example and without limitation by a password or by encryption. The wireless link may be, for example and without limitation, fiber optic cable or radio communication. These could be routed either directly to the motor controller itself or to the electronics bus of the aircraft, or through cockpit interfaces.

Alternatively, one set of nosewheel control apparatus may be provided, outside of the aircraft, with no nosewheel control apparatus in the aircraft.

An advantage of the preferred version of this embodiment is that control of the nosewheel and therefore the aircraft during taxi can be passed between pilot and ground staff as needed at any part of the journey between runway and parking bay. Ground staff with an aerial view of the airport, directly or via computerised image for example, could therefore control several aircraft and co-ordinate their positioning relative to each other much more easily than could pilots, who have very limited visibility. Further, fully or partially automated computer systems could control the driving of all aircraft on the airport taxiways. Such systems could use satellite guidance and/or GPS for example. Furthermore, driving of aircraft for maintenance or other non-flight purposes could be remote without the need for any staff inside the aircraft.

As a further advantage, ground marshals would not be needed to direct the pilot, and ground staff would not be needed to connect tugs to drive the aircraft. This absence of personnel on the ground would mean smaller safety margins would be necessary between aircraft, which would increase the number of aircraft that could be moving on the taxiways at any one time and therefore decrease turnaround time.

Furthermore, the need for verbal communication between airport ground staff and pilots is reduced since ground staff can control the aircraft directly. Such verbal communication is problematic due to high levels of noise at airports, and due to the different nationalities of pilots and airport staff.

As a further advantage, since tracking for the remote controlled taxi system could use any and all location and navigation techniques and technologies known in the art, including GPS, radio, laser, and others, any or all airports in a country, state, or world-wide could co-ordinate as a single unit. This enhances efficiency throughout the various air traffic and aircraft management control systems. Further advantages include the ability to coordinate the taxiing aircraft with other moving aircraft, control and synchronize the taxi of a plurality of aircraft, control and synchronize the taxi of a plurality of aircraft and ground vehicles in an airport, and create a system that is highly fault tolerant to recognize and deal with unplanned circumstances in an efficient manner.

In a sixth embodiment of the invention, a method for controlling the speed of an aircraft on the ground, using a self-propelled nosewheel having the nosewheel control apparatus of any previous embodiment, comprises the steps of: setting a required speed; measuring the speed of said aircraft; comparing the speed of said aircraft with said required speed; sending a signal to said nosewheel control apparatus to change the speed of the aircraft; changing the speed of said aircraft to said required speed.

Said nosewheel control apparatus may be the nosewheel control apparatus of any preceding embodiment and said nosewheel control apparatus additionally comprises means for setting a required speed and means for comparing the speed of said aircraft with said required speed.

Said motor may be a high phase order electrical induction motor or any other induction motor or any other drive means capable of driving an aircraft. In particular, said motor may be any of the motors described in the Background section of this patent.

Said nosewheel control apparatus controls the speed of said nosewheel and may control the steering of said nosewheel.

The speed is preferably controlled non-mechanically, for example, by the application of an alternating magnetic field, where said motor is a high phase order electrical induction motor. Speed may therefore be controlled by altering the frequency of the magnetic field, where a high frequency field creates a higher speed. Furthermore, a stationary field may be used to slow down the motor and therefore the aircraft, or the motors may be driven in reverse to slow down the aircraft. Alternatively, motor speed may be controlled using any non-mechanical motor speed control techniques known in the art, including but not limited to varying voltage, vector field control, slip, current, resistance, and frequency. The advantage of using non-mechanical braking means is that such means do not involve friction and avoid overheating of brakes, which can prevent a safe take-off.

Said speed may alternatively be controlled mechanically, in the form of drive means for acceleration and braking means for deceleration. Said drive means may be a high phase order electrical induction motor or any other induction motor or any other drive means capable of driving an aircraft. In particular, said motor may be any of the motors described in the Background section of this patent. Said braking means may be disc brakes, drum brakes, electromagnetic brakes, electromechanical brakes, anti-lock brakes, or any type of mechanical brakes or wheel retarding means.

Said required speed may be set by a pilot using a control in the cockpit, or remotely by air traffic control staff or other airport staff. Said speed controlling means for setting said speed may be a button, dial, joystick, computer keypad, or any other form of speed setting control, and may be disposed in the cockpit or in a remote location.

The speed of the undercarriage wheel may be measured by contact or non-contact means, using a speedometer or other speed measuring means. Software may be used to send said signal to said speed controlling means.

Figure 4:
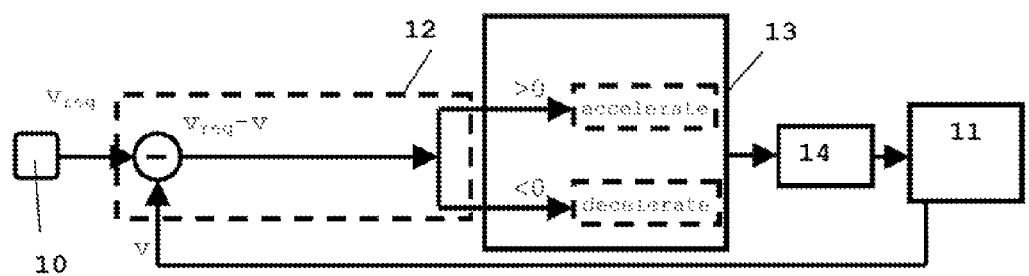
FIG. 4 is a block diagram of the fourth embodiment of the invention, a means of setting a required speed for an aircraft using nosewheel control apparatus.

FIG. 4 shows an example of an implementation of this embodiment of the present invention and should not be considered to be limiting. Referring to FIG. 4, speed setting means 10 and speed monitor 11 are connected to software 12. Software 12 subtracts the required speed $v_{req}$, supplied by the speed setting means, from actual speed v, supplied by the speed monitor, and sends a signal to speed controlling means 13. The speed controlling means are connected to motor 14. If v exceeds $v_{req}$, speed controlling means 13 act to decelerate the motor. If v is less than $v_{req}$, speed controlling means 13 act to accelerate the motor. Motor 14 is connected to the speed monitor. The speed monitor thus constantly monitors the speed and maintains the speed at that set in the speed setting means.

In a seventh embodiment of the invention, a method of reversing an aircraft on the ground is disclosed, said aircraft having at least two self-propelled nosewheels and nosewheel control apparatus. The method comprises reversing the aircraft using said nosewheel control apparatus.

Said nosewheel control apparatus may be any nosewheel control apparatus which is disposed in the cockpit of said aircraft, for controlling any equipment for flight, as in any previous embodiment, but which has four-directional steering or other functionality, so that the left, right, forward and backward directions can be controlled. For example but without limitation, this may be a joystick, side-stick, mouse, scroll ball, keyboard, or yoke. The unit may be modified for this purpose. Alternatively, left and right steering may be controlled by a first nosewheel control apparatus and forward and backward steering may be controlled by a second nosewheel control apparatus, each said nosewheel control apparatus having two-directional functionality. For example, but without limitation, this may be a steering wheel or pedals. As a further alternative, reverse switching means in the form of a toggle switch, push button, keyboard command or other switching means may be used to alter the direction of the motors such that the motors reverse when the reverse switching means are switched to reverse mode, and the motors drive forwards when the reverse switching means are switched to forwards. This alternative would work in conjunction with the nosewheel control apparatus of any previous embodiment.

As a specific example, without limitation, the stick used in flight to control throttle and steer the aircraft may be used. The device used to input throttle during flight may be used to input speed during taxi, and the device used to input steering commands in flight may be used to input steering commands during taxi. In this way, the pilot uses familiar control methods to drive the aircraft.

As a second specific example, without limitation, the device used in flight to control the yaw, pitch, and roll of the aircraft may be used to control the aircraft during taxi, with the yaw control controlling the steering of the aircraft and the pitch control controlling the speed and forward/reverse direction. This would similarly be using control methods familiar to the pilot.

More than one cockpit device may be used in conjunction to control more than one of the speed, steering, forward/reverse direction, and torque of the nosewheel. Furthermore, equipment may be provided in the cockpit to control the speed, steering, forward/reverse direction and/or torque of the nosewheels exclusively.

An eighth embodiment of the invention discloses a method for reducing the turnaround time of an aircraft having at least two self-propelled nosewheels and the nosewheel control apparatus of any previous embodiment, for controlling said nosewheels, said method comprising the steps of: preparing turnaround equipment, for example but not limited to equipment selected from the group consisting of loading bridges, stairs, luggage carts, cargo tractors, and conveyor belt loaders, close to a parking space for the aircraft; turning off the aircraft turbines before arriving at an airport terminal; moving the aircraft to the parking space using self-propelled undercarriage wheels; positioning said turnaround equipment with respect to the aircraft immediately after the aircraft comes to rest; unloading all arriving equipment, for example but not limited to equipment selected from the group consisting of passengers, luggage, cargo, and litter.

Arriving equipment is defined as all persons and objects being unloaded from the aircraft on the aircraft's arrival at the airport. Departing equipment is defined as all persons and objects being loaded onto the aircraft for the aircraft's departure from the airport. Turnaround equipment is defined as all persons and objects which are necessary to facilitate the turnaround process, and which remain at the airport.

In this way, unloading and loading of arriving and departing equipment can commence soon after the aircraft parks, and sooner than would be possible if the aircraft parked using its turbines or a motorised tug.

It should be noted that, although the use of a tug expedites the process between parking and loading/unloading, the tug itself cannot be attached to the aircraft until the turbines have been turned off and come to rest, due to danger and noise considerations, thus the delay caused by the turbines still exists.

Said self-propelled nosewheels may be propelled using a high phase order induction motor located inside the wheel or close to the wheel, or any induction motor or other suitable driving means. In particular, the motor may be any motor described in the Background section of this patent but this patent is not limited to these motors.

The invention also includes the reverse process, that consisting of the steps of: loading passengers, cargo, food and other and departing equipment onto an aircraft; removing loading bridges, stairs, luggage carts, conveyor belts and other turnaround equipment; moving the aircraft to the runway immediately after said departing equipment has been loaded and said turnaround equipment has been removed, using at least one self propelled undercarriage wheel; turning on turbines for take off when the aircraft is in the appropriate position on the runway.

Figure 5:
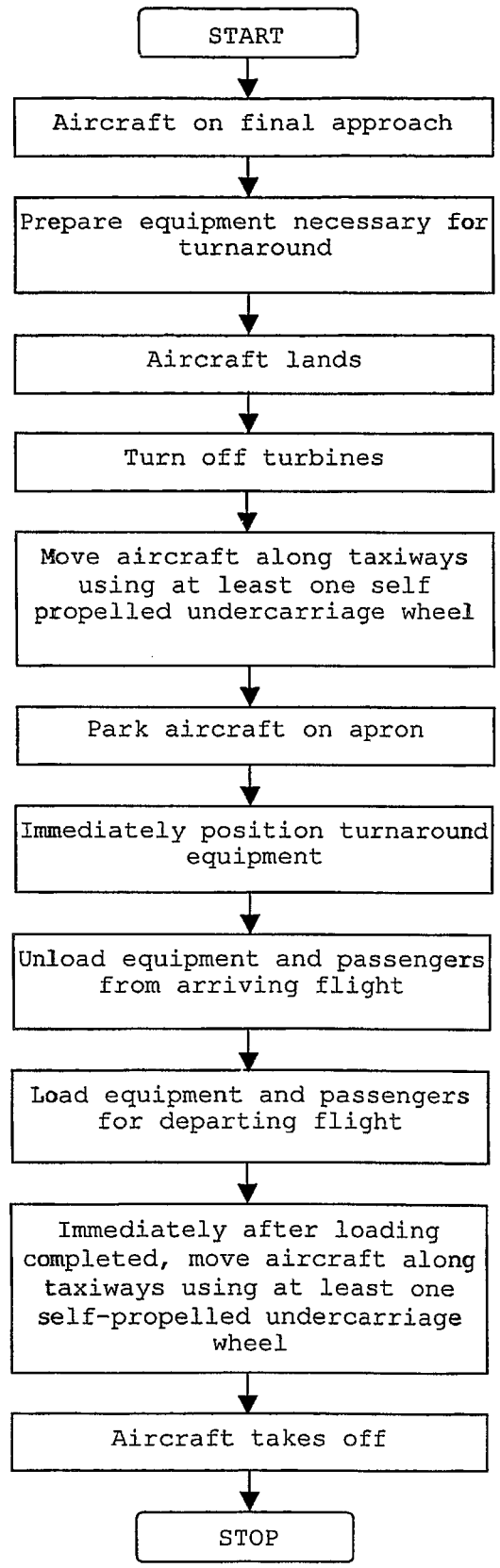
FIG. 5 is a block diagram of the sixth embodiment of the invention, a method for reducing turnover times using nosewheel control apparatus.

A non-limiting example of a method according to the above is shown in the flow chart of FIG. 5.

A ninth embodiment of the invention discloses a method for enhancing communications on airport taxiways, comprising moving the aircraft using the nosewheel control apparatus of any previous embodiment, for controlling at least two self-propelled nosewheels, whereby ground personnel do not require ear protecting equipment and communication is facilitated between ground personnel, and between ground personnel and pilots. Hand signals may no longer be required. Ground personnel are thus able to speak to each other normally to communicate, for example, instructions for directing aircraft.

Ground personnel are defined herein as any persons being present on the taxiway of an airport, including those on, but not in, the aircraft. A taxiway is defined herein as being any space at an airport in which an aircraft may move on the ground and includes aprons, runways and maintenance areas.

An advantage of the present embodiment is that it provides a method for reducing turnaround times at airports, without the need for large-scale modifications to either aircraft or airports. Further advantages of the embodiment include reduced atmospheric pollution, reduced fuel usage, etc.

The above disclosure describes several embodiments of the invention but it will be readily understood that many other arrangements of equipment could comprise this invention and the scope of this patent should be limited only by the appended claims. Further possibilities for an interface between an operator and an aircraft, whereby a motorized aircraft wheel or wheels may be controlled during taxi, include the following.

It may be possible to pre-program, from a cockpit or remotely, the speed of an aircraft and/or the route it takes through all or part of the airport, that is, auto-pilot. In areas of an airport where all aircraft possess remotely controlled, self-propelled undercarriage wheels, no ground staff are needed on the taxiways, thus safety margins are reduced and it would be realistic for aircraft to operate on auto-pilot in these areas. Centralized computer systems could be used to control the routes taken by the aircraft and ensure no collisions. In this way, throughput could be increased and turnover times reduced.

The invention claimed is:

1. An apparatus for driving a taxiing aircraft on the ground, comprising, in an aircraft with a cockpit:
   two self-propelled nosewheels mounted on said aircraft, each said nosewheel having an electric motor drivingly connected thereto;
   equipment for flight located on said aircraft, said equipment for flight being operable when said aircraft is in flight and not operable when said aircraft is taxiing on the ground;

dual-function controlling means switchable to operate both said equipment for flight and said nosewheels, said dual-function controlling means being disposed in the cockpit of said aircraft;

sensing means in communication with said dual-function control means for sensing when the aircraft is on the ground; and switching means switchably connected to said equipment for flight and to said nosewheels and operable to switch said dual-function controlling means between operating said equipment for flight in the air and operating said nosewheels on the ground.

2. The apparatus of claim 1, wherein said dual-function controlling means is operatively connected to at least one device in said cockpit to control at least one of steering, speed, or torque of said nosewheel.

3. The apparatus of claim 1, further comprising a motor controller in communication with said each of said motors and switchably connected to said dual function controlling means for sending instructions to said motors.

4. The apparatus of claim 3, further including a wireless link, wherein the dual-function controlling means is configured to communicate wirelessly with the motor controller or the motors through said wireless link.

5. The apparatus of claim 1, further comprising visual display means in communication with said sensing means disposed in said cockpit for communicating information about the operation of said equipment for flight and said nosewheels.

6. The apparatus of claim 1, said motors having electrical brakes.

7. The apparatus of claim 1, said motors having mechanical brakes.

8. The apparatus of claim 1, wherein said dual-function controlling means is at least one item selected from the group consisting of rudder pedals, brake pedals, yokes, side-sticks, joysticks, mouse, scroll balls, and keyboards.

9. The apparatus of claim 1, wherein said switching means comprises manual switching means to manually switch said dual-function controlling means between the operation of the equipment for flight and the operation of said nosewheel.

10. The apparatus of claim 9, wherein said switching means includes safety means for controlling operation of said manual switching means when the aircraft is taxiing on the ground.

11. The apparatus of claim 9, said switching means being selected from the group consisting of thumb switches, push buttons, and keystroke sequences.

12. The apparatus of claim 9, wherein said aircraft includes steering means for moving the aircraft in a required direction and said switching means is actuated by twisting said steering means, pulling said steering means, or pushing said steering means.

13. The apparatus of claim 9, wherein said manual switching means is a toggle switch.

14. The apparatus of claim 1, wherein the electric motors drivingly connected to said nosewheels are powered, alternatively, by electric power supplied by an aircraft APU or a turbine, and said apparatus includes power switching means for switching the power supply between the APU and the turbine.

15. The apparatus of claim 1, further comprising:

nosewheel control means for controlling taxiing of the aircraft on the ground, wherein said nosewheel control means is located outside the cockpit externally of said aircraft;

transfer means in operative communication with said dual-function controlling means and said nosewheel control means for transferring control between said dual-function controlling means and said nosewheel control means; and external control means in operative communication with said nosewheel control means for controlling said nosewheel control means from a location exterior to said aircraft, whereby control of said nosewheel can be transferred between said dual-function controlling means in the cockpit of said aircraft and the external control means.

16. The apparatus of claim 15, wherein said nosewheel control means controls at least one of steering or speed of said nosewheel.

17. The apparatus of claim 16, wherein said nosewheel control means comprises an automated control system for automatically controlling at least one of speed and direction of said aircraft on the ground in an airport.

18. The apparatus of claim 17, wherein said automated control system includes speed control means for maintaining said aircraft at a constant speed.

19. The apparatus of claim 1, further comprising aircraft speed monitoring and control means in operative communication with said nosewheel motors for setting a required speed of a taxiing aircraft, comparing an actual speed of said aircraft with said required speed, and automatically controlling said speed control means, whereby said speed is adjusted to cause said actual speed to equal said required speed.

20. The apparatus of claim 1, further comprising nosewheel direction and steering control means in operative communication with said nosewheels for setting a required path for a taxiing aircraft and for automatically controlling steering, whereby said nosewheel direction and steering control means automatically steers said aircraft along said required path.

21. The apparatus of claim 20 wherein said nosewheel direction and steering control means is actuatable to alter said required path during taxi.

22. The apparatus of claim 1, wherein said nosewheels further include nosewheel reverse means for moving said aircraft in a reverse direction.

23. The apparatus of claim 1, wherein said dual-function controlling means comprises cockpit control means to control steering and speed of said equipment for flight when said aircraft is in flight.

24. The apparatus of claim 1, wherein said apparatus further includes a nosewheel function control means located externally of the aircraft for controlling said nosewheels from a location outside the aircraft and control transfer means in operative communication with said dual-function controlling means and with said nosewheel function control means for transferring control of said nosewheels between said dual-function controlling means and said nosewheel function control means, whereby operation of said nosewheels can be conducted from the cockpit or remotely from outside the aircraft.

25. The apparatus of claim 1, wherein said motor is selected from the group comprising high phase order electric induction motors, polyphase electric motors, induction electric motors, and induction/reluctance electric motors.

26. An apparatus for controlling, alternatively, the operation of an aircraft equipped with self-propelled nosewheels for independent ground travel and the operation of said aircraft in flight, wherein said aircraft includes a cockpit, cockpit control devices activatable to sustain the aircraft in flight, and a motor drivingly mounted on each of said nosewheels, said apparatus comprising:
   (a) dual-function control means operatively connected to said cockpit control devices and to each of said nosewheels for controlling operation of said cockpit control devices when said aircraft is in flight and operation of said nosewheels when said aircraft is on the ground;
   (b) motor control means for directing operation of each of said motors on said nosewheel to drive said nosewheels in a required path at a desired speed;
   (c) sensing means in operative communication with said dual function control means for sensing when said aircraft is in flight and when said aircraft is on the ground;
   (d) switch means in switching communication with said sensing means, said dual-function control means, said cockpit control devices, and said motor control means to activate said dual-function control means, said cockpit control devices, or said motor control means as required in response to communication from said sensing means indicating that the aircraft is in flight or on the ground, thereby controlling operation of said aircraft in flight or on the ground.

* * * * *